US012731984B2

(12) United States Patent
Hirama

(10) Patent No.: US 12,731,984 B2
(45) Date of Patent: Sep. 8, 2026

(54) PROTECTION CIRCUIT AND RECEIVING APPARATUS

(71) Applicant: JVCKENWOOD Corporation, Yokohama (JP)

(72) Inventor: Nobuyoshi Hirama, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 199 days.

(21) Appl. No.: 18/594,955

(22) Filed: Mar. 4, 2024

(65) Prior Publication Data

US 2024/0213769 A1 Jun. 27, 2024

Related U.S. Application Data

(63) Continuation of application No. PCT/JP2022/023900, filed on Jun. 15, 2022.

(30) Foreign Application Priority Data

Sep. 24, 2021 (JP) ................................ 2021-155680

(51) Int. Cl.
*H02H 9/04* (2006.01)
*H04B 1/40* (2015.01)

(52) U.S. Cl.
CPC ................ *H02H 9/04* (2013.01); *H04B 1/40* (2013.01)

(58) Field of Classification Search
CPC .......... H02H 9/04; H02H 3/20; H02H 3/087; H02H 3/22; H04B 1/40; H02J 7/34;
(Continued)

(56) References Cited

U.S. PATENT DOCUMENTS 10,817,450 B1 * 10/2020 Wei .......................... H02H 3/20
11,630,471 B2 * 4/2023 Delshadpour ........... G05F 1/571
361/91.1

(Continued)

FOREIGN PATENT DOCUMENTS

JP H05249150 A 9/1993
JP 2010098685 A 4/2010

(Continued)

OTHER PUBLICATIONS

International Search Report and Written Opinion of PCT/JP2022/023900, dated Aug. 30, 2022.

*Primary Examiner* — Danny Nguyen
(74) *Attorney, Agent, or Firm* — PROCOPIO, CORY, HARGREAVES & SAVITCH LLP

(57) ABSTRACT

A protection circuit includes a DC5V input part that receives a control signal having a predetermined DC voltage supplied from a transmitter through an HDMI, a lower limit voltage setting part that sets a lower limit voltage of the control signal, a upper limit voltage setting part that sets an upper limit voltage of the control signal, and a DC5V output switching part that allows the control signal pass therethrough to the HDMI receiving LSI when a voltage of the control signal is within a range between the lower limit voltage and the upper limit voltage, and prevents the control signal from passing therethrough to the HDMI receiving LSI when the voltage of the control signal is outside the range between the lower limit voltage and upper limit voltage.

3 Claims, 8 Drawing Sheets

(58) Field of Classification Search
CPC . G06F 1/26; G06F 13/42; G06F 1/266; G05F 1/571
USPC .................................................. 361/91.1, 92
See application file for complete search history.

(56) References Cited

U.S. PATENT DOCUMENTS

| | | | | |
|---|---|---|---|---|
| 2009/0116158 | A1* | 5/2009 | Graves | H02H 3/20 361/91.1 |
| 2011/0068849 | A1* | 3/2011 | Grover | H03K 17/166 327/381 |
| 2011/0089989 | A1 | 4/2011 | Furumiya et al. | |
| 2015/0249804 | A1 | 9/2015 | Kasahara et al. | |
| 2016/0190794 | A1* | 6/2016 | Forghani-Zadeh | H02H 9/045 361/86 |
| 2020/0036182 | A1* | 1/2020 | Hanson | H02H 3/20 |
| 2021/0184490 | A1* | 6/2021 | Rouviere | H02H 3/20 |
| 2022/0244770 | A1* | 8/2022 | Lorin | G06F 1/266 |

FOREIGN PATENT DOCUMENTS

| | | | |
|---|---|---|---|
| JP | 2015162853 | A | 9/2015 |
| WO | 2009150709 | A1 | 12/2009 |

* cited by examiner

VOLTAGE AT TERMINAL
ON TRANSMITTER SIDE

VOLTAGE AT TERMINAL
ON TRANSMITTER SIDE

VOLTAGE AT TERMINAL
ON RECEIVER SIDE 11
111
112
113
114
T11
T12
C1
C2
C3
L1
D1
D2
R1
R2
R3
R4
R5
R6
R7
R8
R9
TR1
TR2
M1
GND
GND
GND
GND

PROTECTION CIRCUIT AND RECEIVING APPARATUS

CROSS REFERENCE TO RELATED APPLICATION

The present application is a bypass continuation of International Patent Application PCT/JP2022/023900, filed on Jun. 15, 2022, which is based upon and claims the benefit of priority from Japanese patent application No. 2021-155680, filed on Sep. 24, 2021 the disclosures of which are incorporated herein in its entirety by reference.

BACKGROUND

The present disclosure relates to a protection circuit and a receiving apparatus.

In recent years, HDMI (High Definition Multimedia Interface) (Registered Trademark) has become popular as one of the interfaces for connecting AV (Audio Visual) apparatuses to each other and transmitting video and audio data. Video and audio data can be simultaneously transmitted at a high speed through one HDMI cable.

In such an input/output circuit for interface connection, a protection circuit is used to prevent the input/output circuit from malfunctioning or breaking down due to disturbances such as noises. As related art, for example, International Patent Publication No. 2009/150709 is known. International Patent Publication No. 2009/150709 discloses a limiter circuit that cuts voltage components higher than an upper limit voltage and those lower than a lower limit voltage from an input voltage.

SUMMARY

An HDMI cable for HDMI connection contains a data line for transmitting video and audio data and a control line for transmitting various control signals, and this control line contains a DC (Direct Current) 5V feeder line for supplying a DC voltage of 5V. In an interface containing such signal lines, when a cable which has already been connected to a transmitter is connected to a receiver, a voltage outside a specified voltage range may be supplied to the receiver due to reflection or resonance. Note that the effects due to reflection or resonance are not taken into consideration in International Patent Publication No. 2009/150709, so that there is a risk that the receiver cannot be reliably protected. Therefore, the related art has a problem that it may be difficult to protect an apparatus when a control signal having a voltage outside a specified voltage range is input due to reflection or resonance.

In an embodiment, a protection circuit includes: a receiving unit configured to receive a control signal having a predetermined DC (Direct Current) voltage supplied from a transmitting apparatus through a data transmission interface; a lower limit voltage setting part configured to set a lower limit voltage of the control signal; an upper limit voltage setting part configured to set an upper limit voltage of the control signal; and a switching part configured to allow the control signal to pass therethrough to a data reception processing unit of the data transmission interface when a voltage of the control signal is within a range between the lower limit voltage and the upper limit voltage, and prevent the control signal from passing therethrough to the data reception processing unit when the voltage of the control signal is outside the range between the lower limit voltage and the upper limit voltage.

Further, in another embodiment, a receiving apparatus includes the above-described protection circuit and further includes the data reception processing unit of the data transmission interface.

DETAILED DESCRIPTION

Figure 1:
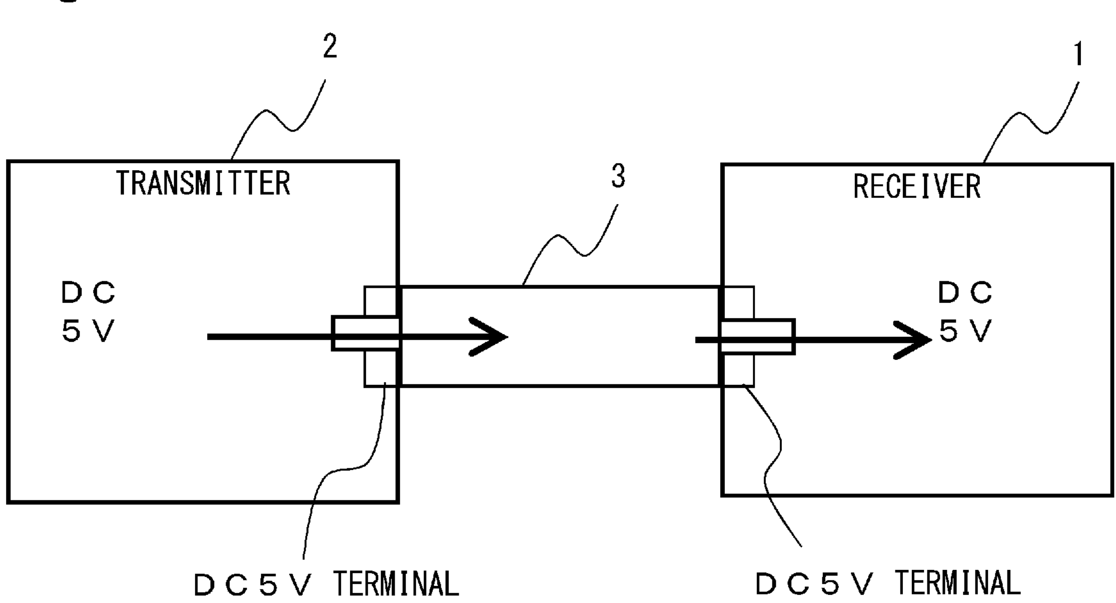
FIG. 1 shows an example in which an HDMI according to related art is used in an ordinary manner.

Embodiments will be described hereinafter with reference to the drawings. The same elements are assigned the same reference numerals (or symbols), and redundant descriptions thereof will be omitted as appropriate.

Outline of Embodiment

Firstly, related art to which an embodiment is not applied will be examined. As described above, an HDMI cable contains a DC5V feeder line, and when a transmitter and a receiver are connected to each other by such an HDMI cable, a DC voltage of 5V is first supplied from the transmitter to the receiver through the DC5V feeder line. Since this DC voltage of 5V is a DC signal, no special circuit such as a protection circuit is provided in the related art. However, at the moment when the DC voltage of 5V is input to the receiver side, reflection or resonance may occur at the terminal inside the receiver, and it may cause the receiver to break down depending on the state of the apparatus and/or the cable.

FIG. 1 shows an example in which an HDMI according to related art is used in an ordinary manner. In FIG. 1, a transmitter 2, which is a source apparatus, and a receiver 1, which is a sink apparatus, are connected to each other through an HDMI cable 3. In this state, when the transmitter 2 and the receiver 1 are powered on, the use of the transmitter 2 and the receiver 1 is started. Then, a DC voltage is supplied from a DC5V terminal on the transmitter 2 side, and the DC voltage is transmitted to a DC5V terminal on the receiver 1 side through a DC5V feeder line of the HDMI cable 3.

Figure 2A:
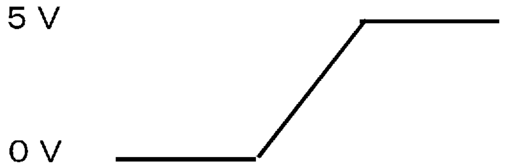
FIG. 2A shows an example of a waveform of a DC5V signal in related art.
Figure 2B:
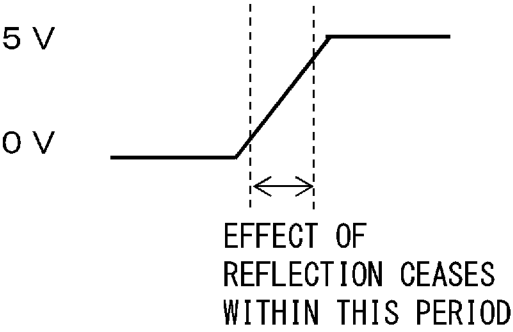
FIG. 2B shows an example of a waveform of a DC5V signal in related art.

FIGS. 2A and 2B show voltage waveforms observed at the DC5V terminals on the transmitter 2 side and on the receiver 1 side. As shown in FIGS. 2A and 2B, when the HDMI is used in an ordinary manner as shown in FIG. 1, the voltage rising time is long, so that the effect of a reflection occurring on the receiver 1 side ceases during the voltage rising period. Therefore, the waveforms of the DC5V signals are stable and normal on both the transmitter 2 side and the receiver 1 side. That is, as shown in FIG. 2A, the voltage at the DC5V terminal on the transmitter 2 side rises gently from 0V to 5V in a ramp shape, so that a constant voltage of 5V is output. Further, as shown in FIG. 2B, the voltage at the DC5V terminal on the receiver 1 side also rise from 0V to 5V in a similar manner, so that a constant voltage of 5V is output.

Figure 3:
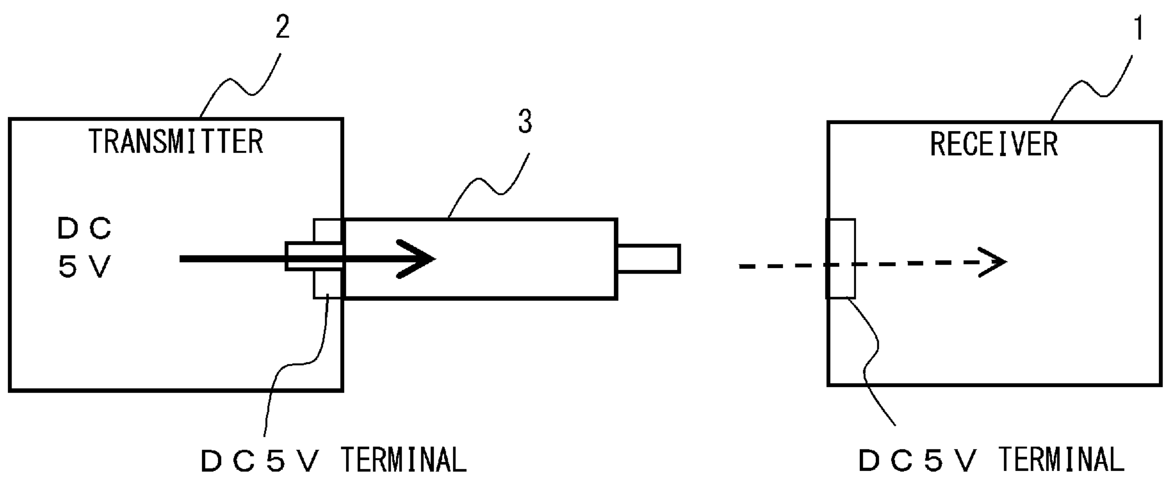
FIG. 3 shows another example in which an HDMI according to related art is used.

FIG. 3 shows another example in which an HDMI according to related art is used. In FIG. 3, the HDMI cable 3 is connected only to the transmitter 2 side. As shown in FIG. 3, when the transmitter 2 has already been powered on in a state in which the HDMI cable 3 has not yet been connected to the receiver 1 side, it is in a state in which a DC voltage of 5V is output from the DC5V terminal on the transmitter 2 side to the tip (open end) of the HDMI cable 3. In this state, the HDMI cable 3 may be inserted into the HDMI terminal of the receiver 1 and the use thereof is thereby started.

Figure 4A:
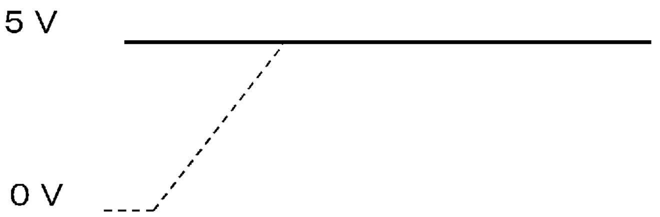
FIG. 4A shows another example of a waveform a DC5V signal in related art.
Figure 4B:
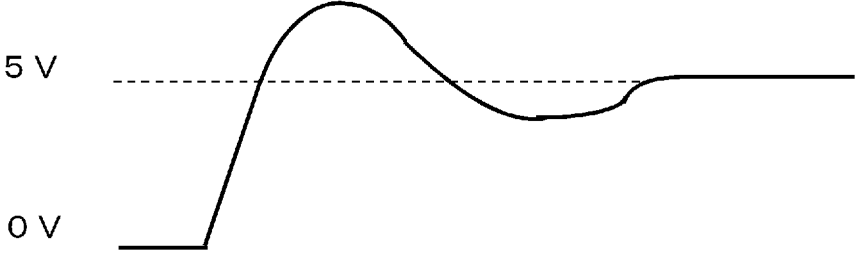
FIG. 4B shows another example of a waveform a DC5V signal in related art.

FIGS. 4A and 4B show voltage waveforms observed at the DC5V terminal on the transmitter 2 side and on the receiver 1 side when the HDMI cable 3 is connected to the receiver 1 in the state shown in FIG. 3. As shown in FIGS. 4A and 4B, when the HDMI cable 3 is connected in the state in which the voltage of 5V has already been output on the transmitter 2 side, the waveform (i.e., the voltage) at the DC5V terminal on the receiver 1 side sharply rises. Therefore, reflection occurs, and due to the effect thereof, a period in which the voltage at the terminal on the receiver 1 side significantly exceeds 5V may occur. That is, although the constant DC voltage of 5V is output at the DC5V terminal on the transmitter 2 side as shown in FIG. 4A, the voltage sharply rises from 0V and significantly exceeds 5V at the DC5V terminal on the receiver 1 side as shown in FIG. 4B. After that, the voltage widely fluctuates, temporarily falls below 5V, and stabilizes at 5V. Similarly, when an electrostatic noise occurs, an overvoltage occurs. However, in the case of reflection, frequency components lower than those of the electrostatic noise fluctuate.

The cause of such reflection will be described further. The HDMI cable 3, to which the powered-on transmitter 2 is connected, is in the state in which the DC voltage of 5V is being applied to the HDMI cable 3 from the transmitter 2 and hence it is electrically charged. When the receiver 1 is connected to the HDMI cable 3 in this state, the electrical charge charged in the HDMI cable 3 flows toward the receiver 1. In this process, the current may not flow uniformly and consistently due to the effect of the LC components parasitic in the HDMI cable 3 and the wiring line to the receiver 1 (i.e., to the load to which the DC voltage of 5V is applied). In this process, a part(s) in which there is a large amount of electric charge and a part(s) in which there is a small amount of electric charge (a dense part(s) and a sparse part(s)) are formed inside the HDMI cable 3. As a result, when the voltage, which is fluctuating, reaches the receiver 1, a reflection phenomenon occurs in a manner similar to that caused in a high-frequency circuit.

After that, when the replenishment of electric charge from the transmitter 2 for the insufficiency thereof is completed, the voltage is stabilized at the DC voltage of 5V and the above-described phenomenon ceases. Therefore, the longer the HDMI cable is, the larger the effect of reflection becomes and the longer the period until the phenomenon ceases becomes. For example, an HDMI optical cable for long-distance transmission may be used. Although the data line of the HDMI optical cable is an optical fiber, the control line thereof is a metal line, so that the effect of reflection increases according to the length of the cable.

Figure 5:
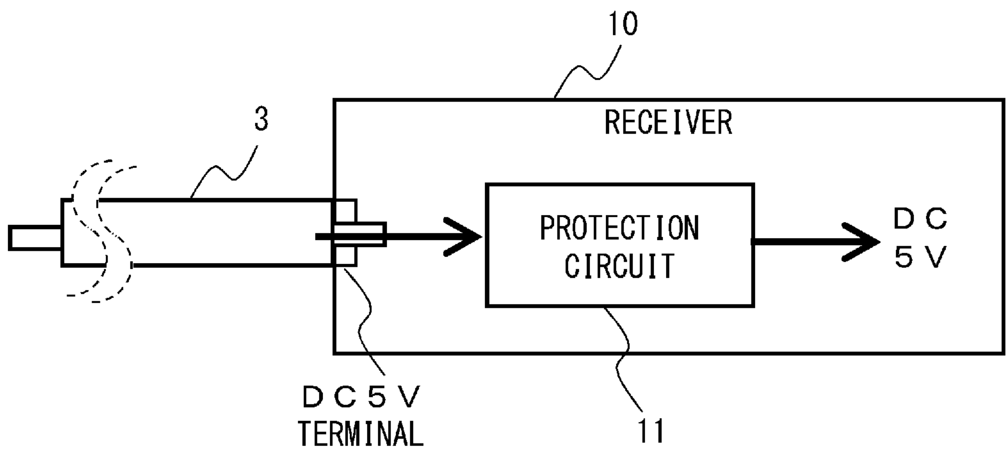
FIG. 5 is a configuration diagram showing an outline of a receiver according to an embodiment.

FIG. 5 shows an outline of a receiver 10 according to an embodiment. In the embodiment, a protection circuit 11 is added to the receiver 10 in order to prevent the receiver 10 from breaking down due to effects such as the above-described reflection. The protection circuit 11 is not a protection component against electrostatic discharge (ESD: Electro Static Discharge), but is a protection circuit dedicated to countermeasures against reflection, i.e., is a reflection prevention circuit. As described above, it is possible to prevent an apparatus from breaking down due to reflection, which occurs on a receiver side of an HDMI when the receiver is connected to the transmitter, by providing a reflection countermeasure circuit in a DC5V input part on the receiver side of the HDMI.

First Embodiment

Figure 6:
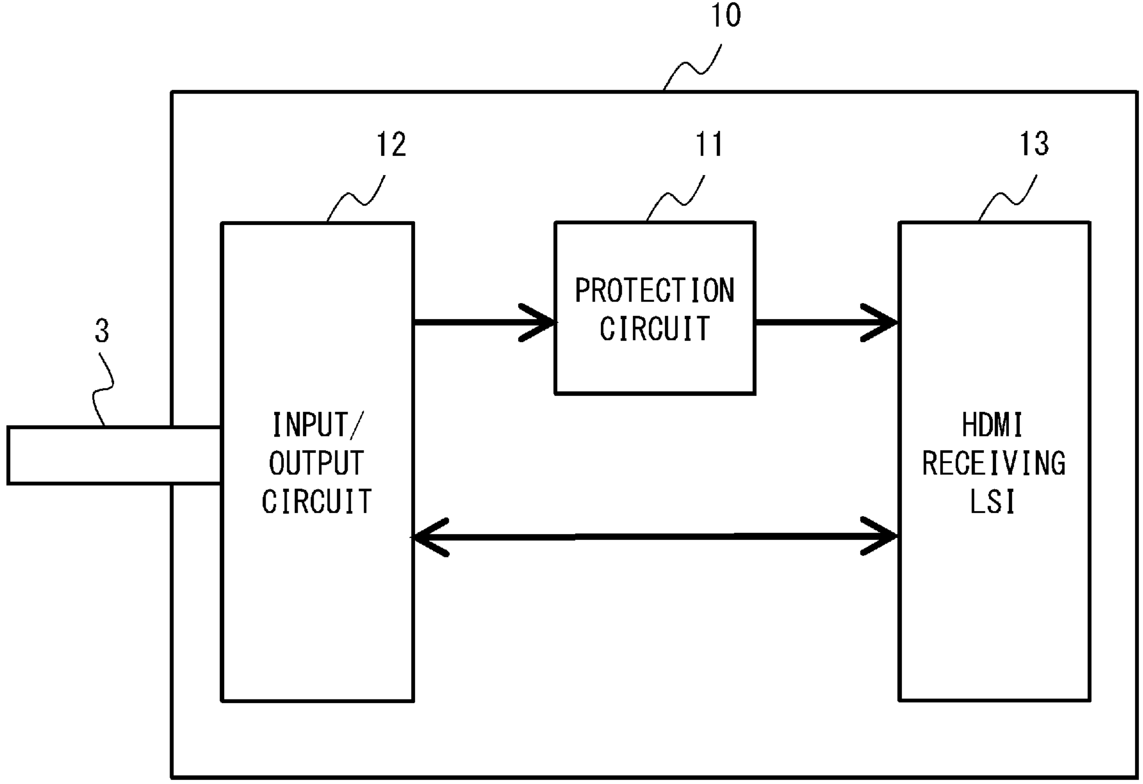
FIG. 6 is a configuration diagram showing an example of a configuration of a receiver according to a first embodiment.

Next, a first embodiment will be described with reference to the drawings. FIG. 6 shows an example of a configuration of a receiver according to this embodiment. A receiver 10 according to this embodiment is a receiving apparatus that receives video and audio data from a transmitter 2 through an HDMI cable 3. The receiver 10 is, for example, a projector apparatus, but it may be a display device or any of other receiving apparatuses. In the case where an apparatus is installed at a place distant from the transmitter 2, such as in the case of a projector apparatus, the length of the HDMI cable 3 increases, so that it is likely to be affected by reflection. Note that the HDMI is just an example of data transmission interfaces, and other interfaces for transmitting and receiving data and/or control signals may be used in a manner similar to that in which the HDMI is used.

As shown in FIG. 6, the receiver 10 includes a protection circuit 11, an input/output circuit 12, and an HDMI receiving LSI (Large Scale Integration) 13. The input/output circuit 12 includes a terminal in which the HDMI cable 3 is inserted and removed, and receives and outputs data and control signals through the HDMI cable 3. The input/output circuit 12 outputs a DC5V signal, which is one of the control signals from the HDMI cable 3, to the protection circuit 11, and receives/outputs other control signals and data signals from/to the HDMI receiving LSI 13.

The protection circuit 11 supplies only a DC5V signal having a normal voltage to the HDMI receiving LSI 13, and protects the HDMI receiving LSI 13 from a DC5V signal having an abnormal voltage. The protection circuit 11 allows a DC5V signal input from the input/output circuit 12 to pass therethrough to the HDMI receiving LSI 13 when the voltage of the DC5V signal is within a predetermined range, and cuts off the output of the input DC5V signal and thereby prevents it from passing therethrough to the HDMI receiving LSI 13 when the voltage of the DC5V signal is outside the predetermined range. For example, the protection circuit 11 sets upper and lower limit voltages of the DC5V signal, and allows only a DC5V signal having a voltage in a range between the set upper and lower limit voltages to pass therethrough. It is possible to protect the HDMI receiving LSI 13 from an overvoltage by cutting off at least signals having voltages higher than the predetermined upper limit voltage. Further, it is possible to prevent the HDMI receiving LSI 13 from malfunctioning by cutting off signals having voltages lower than the predetermined lower limit voltage.

The HDMI receiving LSI 13 is a data reception processing unit for the HDMI, and processes data and control signals received from the transmitter 2 through the HDMI cable 3. The HDMI receiving LSI 13 receives a DC5V signal from the protection circuit 11, and receives/outputs other control signals and data from/to the input/output circuit 12. When the HDMI receiving LSI 13 detects a DC5V signal supplied from the protection circuit 11, it generates an HPD (Hot Plug Detect) signal and responds to the transmitter 2 through the input/output circuit 12 by the generated HPD signal. Further, the HDMI receiving LSI 13 also outputs receiver information to the transmitter 2 by a DDC (Display Data Channel) signal.

Figure 7:
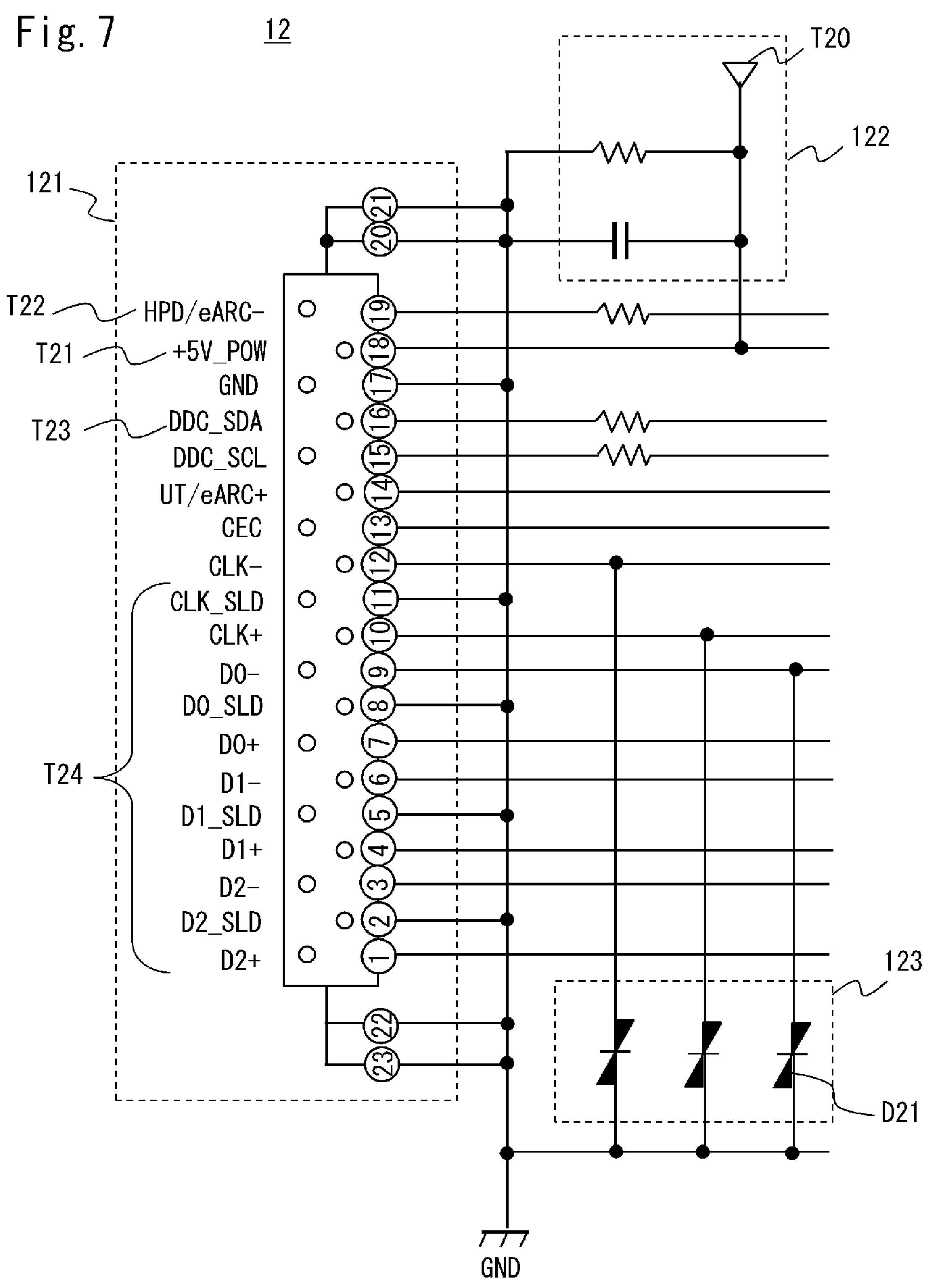
FIG. 7 is a circuit diagram showing an example of a configuration of an input/output circuit according to the first embodiment.

FIG. 7 shows an example of a configuration of the input/output circuit 12 according to this embodiment. As shown in FIG. 7, the input/output circuit 12 includes a terminal part 121, a DC5V output part 122, and an electrostatic protection part 123.

The terminal part 121 is an HDMI connector in which the HDMI cable 3 is inserted and removed, and includes a plurality of terminals corresponding to respective lines of the inserted HDMI cable 3. For example, the terminal part 121 includes a DC5V terminal T21 connected to a DC5V feeder line, an HPD terminal T22 connected to an HPD line, a DDC terminal T23 connected to a DDC line, a data terminal T24 connected to a data line, and the like. The DC5V terminal T21 is connected to the DC5V output part 122. Further, the HPD terminal T22, the DDC terminal T23, and the data terminal T24 are connected to the HDMI receiving LSI 13. Note that the DC5V feeder line, the HPD line, and the DDC line are examples of control signals, and the control lines include a CEC (Consumer Electronics Control) line and the like. Further, the data signal is a differential signal. For example, the data line and the data terminal T24 include data transmission lines for transmitting three differential signals, a clock transmission line, and other terminals.

The DC5V output part 122 outputs a DC5V signal input from the HDMI cable 3 to the DC5V terminal T21 to the protection circuit 11. The DC5V output part 122 includes an output terminal T20 connected to the DC5V terminal T21, and outputs the DC5V signal from the output terminal T20.

The electrostatic protection part 123 cuts off electrostatic noises of data signals input to the data terminal T24 and thereby protects the HDMI receiving LSI 13. In this example, the electrostatic protection part 123 includes a bidirectional Zener diode D21 as an electrostatic protection element. The bidirectional Zener diode D21 is connected between the data terminal T24 and a ground GND. When a voltage exceeding a predetermined voltage is applied to the bidirectional Zener diode D21, it enters a short-circuit mode, so that a current starts to flow therethrough. Therefore, when an overvoltage is input from the data line, the bidirectional Zener diode D21 allows a current to flow to the ground GND therethrough, and thereby prevents a signal having a voltage equal to or higher than the predetermined voltage from being input to the HDMI receiving LSI 13. Further, since the bidirectional Zener diode D21 has similar characteristics in both directions, it also provides protection against an overvoltage of a signal flowing in a negative direction (i.e., in an opposite direction).

As described above, it is possible to protect the receiver from sudden electrostatic noises by an electrostatic protection element such as a Zener diode. However, in the case of reflection, frequency components lower than those of electrostatic noises, i.e., frequency components that rise and fall more gently than electrostatic noises do, fluctuate, so that it is not possible to protect the receiver by using such an electrostatic protection element alone. Therefore, in this embodiment, an apparatus is protected from the effect of reflection by a dedicated protection circuit.

Figure 8:
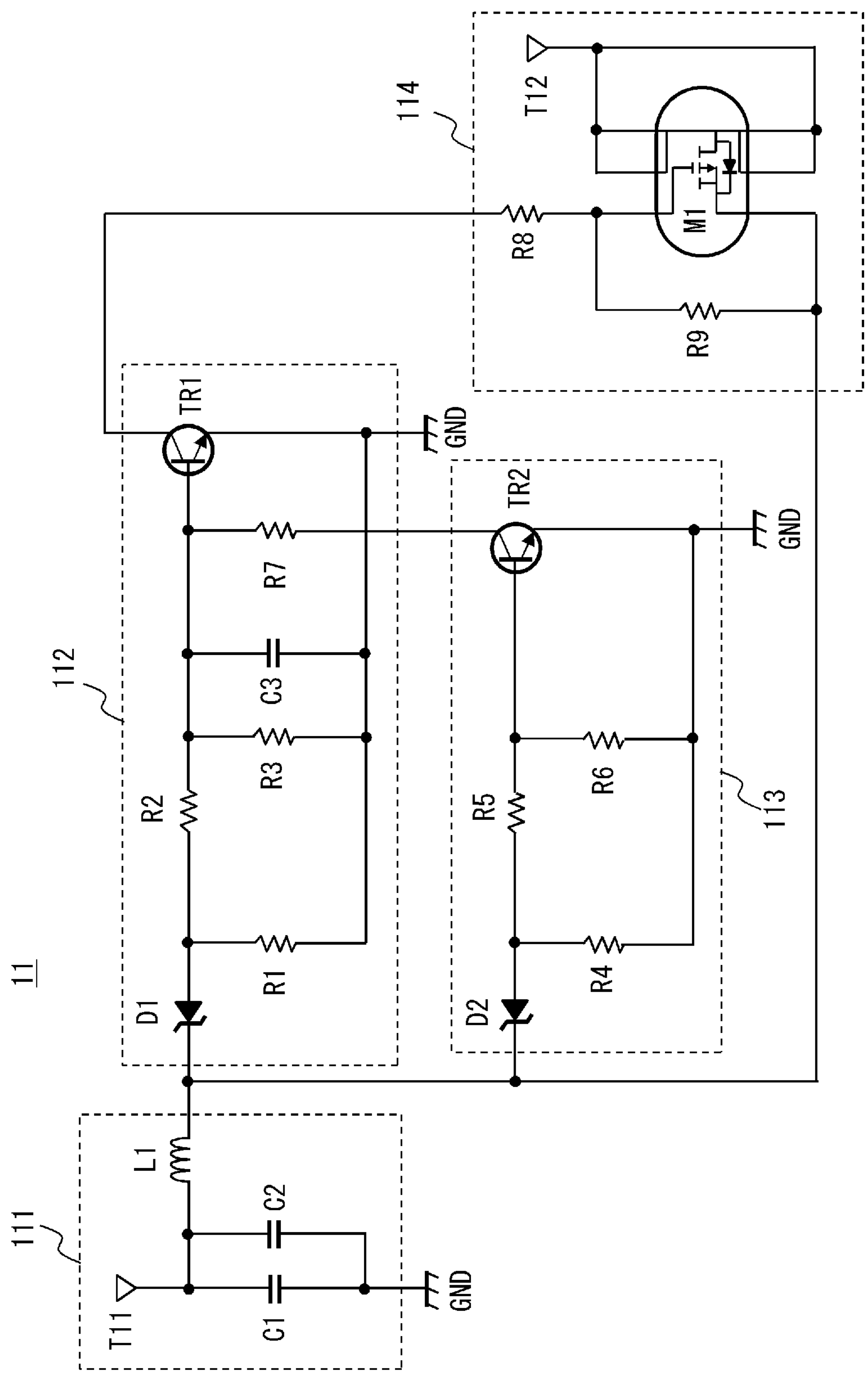
FIG. 8 is a circuit diagram showing an example of a configuration of a protection circuit according to the first embodiment.

FIG. 8 shows an example of a configuration of the protection circuit 11 according to this embodiment. As shown in FIG. 8, the protection circuit 11 includes a DC5V input part 111, a lower limit voltage setting part 112, an upper limit voltage setting part 113, and a DC5V output switching part 114.

The DC5V input part 111 is a receiving unit that receives a DC voltage of 5V supplied from the transmitter 2 through the HDMI cable 3. The DC5V input part 111 outputs the DC5V signal input from the input/output circuit 12 to the lower limit voltage setting part 112, the upper limit voltage setting part 113, and the DC5V output switching part 114. The DC5V input part 111 includes an input terminal T11 connected to the output terminal T20 of the input/output circuit 12, and the DC5V signal supplied from the HDMI cable 3 is input to the input terminal T11.

Capacitors C1 and C2 are connected in parallel between the input terminal T11 and the ground GND. An inductor L1 is connected between a node between the input terminal T11 and the capacitors C1 and C2 and a node connected to the lower limit voltage setting part 112, the upper limit voltage setting part 113, and the DC5V output switching part 114. The capacitors C1 and C2 and the inductor L1 constitute a low-pass filter and remove high-frequency noises of the DC5V signal.

The lower limit voltage setting part 112 sets a lower limit voltage for the passage of the DC5V signal. When the voltage of the DC5V signal supplied from the DC5V input part 111 is higher than the set lower limit voltage, the lower limit voltage setting part 112 controls the DC5V output switching part 114 so as to allow the DC5V signal to pass therethrough. Further, when the voltage of the DC5V signal supplied from the DC5V input part 111 is lower than the set lower limit voltage, the DC5V output switching part 114 controls the DC5V output switching part 114 so as to prevent the DC5V signal from passing therethrough.

The lower limit voltage setting part 112 includes a Zener diode D1, resistors R1 to R3, a capacitor C3, and an NPN transistor TR1. The Zener diode D1 and the resistor R2 are connected in series between the inductor L1 of the DC5V input part 111 and the base (control terminal) of the NPN transistor TR1. The inductor L1 is connected to the cathode of the Zener diode D1, and the resistor R2 is connected to the anode of the Zener diode D1.

The resistor R1 is connected between a node between the Zener diode D1 and the resistor R2 and the emitter of the NPN transistor TR1 (i.e., the ground GND). The resistor R3 and the capacitor C3 are connected in parallel between a node between the resistor R2 and the base of the NPN transistor TR1 and the emitter of the NPN transistor TR1 (i.e., the ground GND). The collector (first terminal) of the NPN transistor TR1 is connected to the control terminal of the DC5V output switching part 114, and the emitter (second terminal) of the NPN transistor TR1 is connected to the ground GND.

The Zener diode D1 and the resistors R2 and R3 are lower limit voltage setting elements for setting the lower limit voltage. The Zener diode D1 allows a predetermined constant voltage (Zener voltage) to pass therethrough according to the DC5V signal supplied through the inductor L1. The constant voltage generated by the Zener diode D1 is, for example, 3.3V. The resistor R1 is connected in series with the Zener diode D1 and is a resistor for operating the Zener diode D1 at the constant voltage. The resistors R2 and R3 are voltage dividing resistors connected in series with the Zener diode D1 and generate a divided voltage according to the signal that has passed through the Zener diode D1. The divided voltage generated by the voltage dividing resistors R2 and R3 is, for example, 1.0V. The lower limit voltage is set to 4.3V obtained by the constant voltage 3.3V of the Zener diode D1 and the divided voltage 1.0V obtained by the voltage dividing resistors R2 and R3. Note that the voltage set by the Zener diode D1 and the voltage dividing resistors R2 and R3 is just an example, and other voltages may be used.

The NPN transistor TR1 is a first switching element that is turned on/off according to the DC5V signal. Although the NPN transistor TR1 is an NPN-type bipolar transistor, it may be other types of switching element as long as it can perform similar operations. When the DC5V signal is higher than the lower limit voltage set by the Zener diode D1 and the resistors R2 and R3, the NPN transistor TR1 switches the signal that is supplied to the control terminal of the DC5V output switching part 114. That is, when a voltage higher than the lower limit voltage is applied to the DC5V input part 111, the NPN transistor TR1 is turned on, and the collector and emitter of the NPN transistor TR1 become electrically conductive to each other. As a result, the control terminal of the DC5V output switching part 114 is connected to the ground GND, and the DC5V output switching part 114 is turned on, so that the DC5V signal passes through the DC5V output switching part 114.

The capacitor C3 is a delay element for delaying the DC5V signal that has passed through the Zener diode D1. The NPN transistor TR1 performs a switching operation according to the DC5V signal delayed by the capacitor C3. It is possible to stabilize the On/Off operation of the NPN transistor TR1 by delaying the rise of the signal by the capacitor C3.

The upper limit voltage setting part 113 sets an upper limit voltage for the passage of the DC5V signal. The upper limit voltage is higher than the lower limit voltage set by the lower limit voltage setting part 112 and is a voltage specified as the DC5V signal or a voltage in a permissible voltage range of the HDMI receiving LSI. When the voltage of the DC5V signal supplied from the DC5V input part 111 is higher than the set upper limit voltage, the upper limit voltage setting part 113 controls the DC5V output switching part 114 so as to prevent the DC5V signal from passing therethrough. That is, when the DC5V signal exceeds the upper limit voltage while the DC5V signal higher than the lower limit voltage is passing through the DC5V output switching part 114, the output of the DC5V signal from the DC5V output switching part 114 is cut off. In this example, the upper limit voltage setting part 113 controls the DC5V output switching part 114 by turning off the NPN transistor TR1 of the lower limit voltage setting part 112 to prevent the DC5V signal from passing therethrough.

The upper limit voltage setting part 113 has a circuit configuration similar to that of the lower limit voltage setting part 112, except for the capacitor C3. Specifically, the upper limit voltage setting part 113 includes a Zener diode D2, resistors R4 to R7, and an NPN transistor TR2. The Zener diode D2 and the resistor R5 are connected in series between the inductor L1 of the DC5V input part 111 and the base of the NPN transistor TR2. The inductor L1 is connected to the cathode of the Zener diode D2, and the resistor R5 is connected to the anode of the Zener diode D2.

The resistor R4 is connected between a node between the Zener diode D2 and the resistor R5 and the emitter of the NPN transistor TR2 (i.e., the ground GND). The resistor R6 is connected between a node between the resistor R5 and the base of the NPN transistor TR2 and the emitter of the NPN transistor TR2 (i.e., the ground GND). The collector of the NPN transistor TR2 is connected to the base of the NPN transistor TR1 through the resistor R7, and the emitter of the NPN transistor TR2 is connected to the ground GND.

The Zener diode D2 and the resistors R5 and R6 are upper limit voltage setting elements for setting the upper limit voltage. The Zener diode D2 allows a predetermined constant voltage (Zener voltage) to pass therethrough according to the DC5V signal supplied through the inductor L1. The constant voltage generated by the Zener diode D2 is, for example, 5.1V. The resistor R4 is connected in series with the Zener diode D2 and is a resistor for operating the Zener diode D2 at the constant voltage. The resistors R5 and R6 are voltage dividing resistors connected in series with the Zener diode D2 and generate a divided voltage according to the signal that has passed through the Zener diode D2. The divided voltage generated by the voltage dividing resistors R5 and R6 is, for example, 1.0V. The upper limit voltage is set to 6.1V obtained by the constant voltage 5.1V of the Zener diode D2 and the divided voltage 1.0V obtained by the voltage dividing resistors R5 and R6. Note that the voltage set by the Zener diode D2 and the voltage dividing resistors R5 and R6 is just an example, and other voltages may be used.

The NPN transistor TR2 is a second switching element that is turned on/off according to the DC5V signal. Although the NPN transistor TR2 is an NPN-type bipolar transistor, it may be other types of switching element as long as it can perform similar operations. When the DC5V signal is higher than the upper limit voltage set by the Zener diode D2 and the resistors R5 and R6, the NPN transistor TR2 switches the signal that is supplied to the base of the NPN transistor TR1. That is, when a voltage higher than the upper limit voltage is applied to the DC5V input part 111, the NPN transistor TR2 is turned on, and the collector and emitter of the NPN transistor TR2 become electrically conductive to each other. As a result, the base of the NPN transistor TR1 is connected to the ground GND, and the NPN transistor TR1 is turned off. Then, the control terminal of the DC5V output switching part 114 is disconnected from the ground GND, and the DC5V output switching part 114 is turned off, so that the output of the DC5V signal supplied from the DC5V output switching part 114 is cut off.

Note that a delay element for delaying a signal, such as the capacitor C3 of the lower limit voltage setting part 112, is preferably not provided in the upper limit voltage setting part 113. In this way, when the voltage of the DC5V signal exceeds the upper limit, the passage of the DC5V signal can be immediately cut off.

The DC5V output switching part 114 switches the passage/cutting-off of the DC5V signal according to the voltage of the DC5V signal. In this example, the DC5V output switching part 114 switches (i.e., selects one of) a state in which it allows the DC5V signal to pass therethrough to the HDMI receiving LSI 13 and a state in which it prevents the DC5V signal from passing therethrough to the HDMI receiving LSI 13. The DC5V output switching part 114 allows the DC5V signal to pass therethrough to the HDMI receiving LSI 13 when the voltage of the DC5V signal is within the range between the lower limit voltage set by the lower limit voltage setting part 112 and the upper limit voltage set by the upper limit voltage setting part 113, and cuts off the output of the DC5V signal to the HDMI receiving LSI 13 when the voltage of the DC5V signal is outside the range between the lower limit voltage set by the lower limit voltage setting part 112 and the upper limit voltage set by the upper limit voltage setting part 113.

The DC5V output switching part 114 includes a PMOS transistor M1, resistors R8 and R9, and an output terminal T12 connected to the HDMI receiving LSI 13. The gate (control terminal) of the PMOS transistor M1 is connected to the collector of the NPN transistor TR1 of the lower limit voltage setting part 112 through the resistor R8. The resistor R9 is connected between the gate and source (first terminal) of the PMOS transistor M1. The source of the PMOS transistor M1 is connected to the inductor L1 of the DC5V input part 111. The drain (second terminal) of the PMOS transistor M1 is connected to the output terminal T12.

The PMOS transistor M1 is a third switching element that is turned on/off according to the On/Off-state of the NPN transistor TR1. Although the PMOS transistor M1 is a P-channel type MOSFET (Metal-Oxide-Semiconductor Field Effect Transistor), it may be other types of switching element as long as it can perform similar operations. When the DC5V signal is being supplied to the source of the PMOS transistor M1 through the inductor L1, and the NPN transistor TR1 is in an Off-state, the potentials at the gate and source of the PMOS transistor M1 become equal to each other by the resistor R9, so that the PMOS transistor M1 is turned off. Therefore, the DC5V signal is cut off. When the DC5V signal is being supplied to the source of the PMOS transistor M1 through the inductor L1, and the NPN transistor TR1 is in an On-state, the potential at the gate of the PMOS transistor M1 decreases, so that the PMOS transistor M1 is turned on. Therefore, the DC5V signal is output from the output terminal T12.

Figure 9:
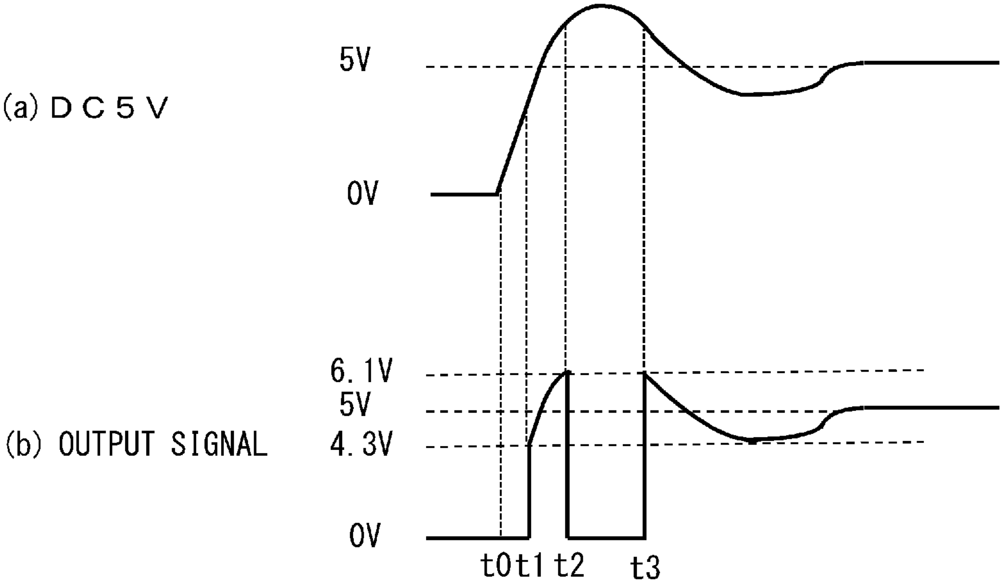
FIG. 9 shows an example of waveforms of signals of the protection circuit according to the first embodiment.

FIG. 9 shows an example of signal waveforms of the protection circuit 11. A part (a) of FIG. 9 shows an example of the DC5V signal input to the protection circuit 11, and a part (b) of FIG. 9 shows an example of the output signal output from the protection circuit 11.

When the HDMI cable 3 connected to the transmitter 2 and supplied with the DC5V signal is connected to the receiver 10, the DC5V signal starts to rise from 0V at a time t0. In the period from t0 to t1, since the DC5V signal is lower than the lower limit voltage 4.3V set by the lower limit voltage setting part 112, the NPN transistor TR1 is in an Off-state, and the PMOS transistor M1 is also in an Off-state, so the output signal remains at 0V.

At the time t1, when the DC5V signal exceeds the lower limit voltage 4.3V, the NPN transistor TR1 is turned on after the delay by the capacitor C3, so the PMOS transistor M1 is turned on, and the input DC5V signal is output as the output signal. In the period from t1 to t2, since the DC5V signal is within the range between the lower limit voltage 4.3V and the upper limit voltage 6.1V, the voltage equal to the voltage of the DC5V signal is output.

At the time t2, when the DC5V signal exceeds the upper limit voltage 6.1V set by the upper limit voltage setting part 113, the NPN transistor TR2 is turned on, so that the NPN transistor TR1 is turned off. Then, since the PMOS transistor M1 is turned off, the DC5V signal is cut off, and the output signal becomes 0V. In the period from t2 to t3, since the DC5V signal is higher than the upper limit voltage of 6.1V, the output signal remains at 0V.

At the time t3, when the voltage of the DC5V signal falls below the upper limit voltage of 6.1V, the NPN transistor TR2 is turned off and the NPN transistor TR1 is turned on. Then, since the PMOS transistor M1 is turned on, the input DC5V signal is output as the output signal. At and after the time t3, after the voltage fluctuates within the range between the lower limit voltage 4.3V and the upper limit voltage 6.1V, it is stabilized at 5V, so that the voltage equal to the voltage of the DC5V signal is output.

Figure 10:
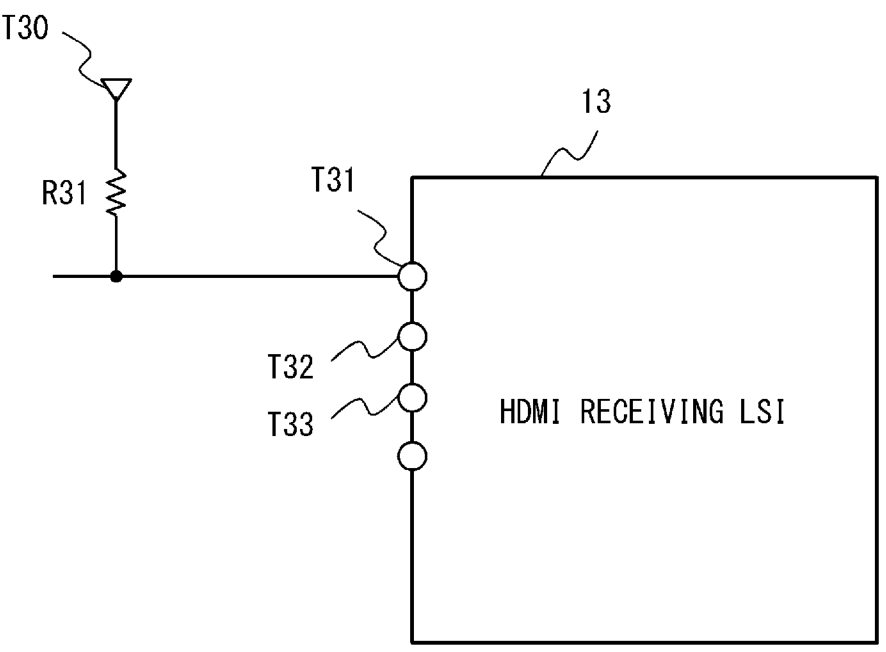
FIG. 10 shows an example of connection of an HDMI receiving LSI according to the first embodiment.

FIG. 10 shows an example of connection of the HDMI receiving LSI 13 according to this embodiment. As shown in FIG. 10, an input terminal T30 is connected to the output terminal T12 of the protection circuit 11, and the DC5V signal, which has passed through the protection circuit 11, is input to the input terminal T30. The input terminal T30 is connected to the DC5V input terminal T31 of the HDMI receiving LSI 13 through a resistor R31 serving as a pull-up resistor. The DC5V signal, which has passed through the protection circuit 11, is input from the input terminal T30 to the DC5V input terminal T31.

For example, the receiving LSI 13 monitors the voltage at the DC5V input terminal T31, and when it detects the supply of the DC voltage of 5V, outputs an HPD signal from the HPD terminal T32. The HPD signal is transmitted to the transmitter 2 through the HPD terminal T22 of the input/output circuit 12 and the HPD line of the HDMI cable 3. The transmitter 2 recognizes the connection of the receiver 10 by detecting the HPD signal, and reads out receiver information from the DDC terminal T33 of the receiving LSI 13 through the DDC line of the HDMI cable 3 and the DDC terminal T23 of the input/output circuit 12.

As described above, in this embodiment, a protection circuit for countermeasures against reflection is provided in the DC5V input part of the receiver for the HDMI. In the protection circuit, an upper limit voltage and a lower limit voltage are set as a range of a normal DC voltage of 5V, and the protection circuit is controlled so that only when the input DC voltage of 5V is within a range between the upper limit voltage and the lower limit voltage, the DC voltage of 5V is supplied to the HDMI receiving LSI. In this way, it is possible to prevent an apparatus from breaking down due to reflection which occurs on a receiver side when an HDMI cable, which is in a state in which the HDMI cable has already been connected only to the transmitter side and hence a DC voltage of 5V is being output in the HDMI cable, is connected to the receiver side.

Second Embodiment

Figure 11:
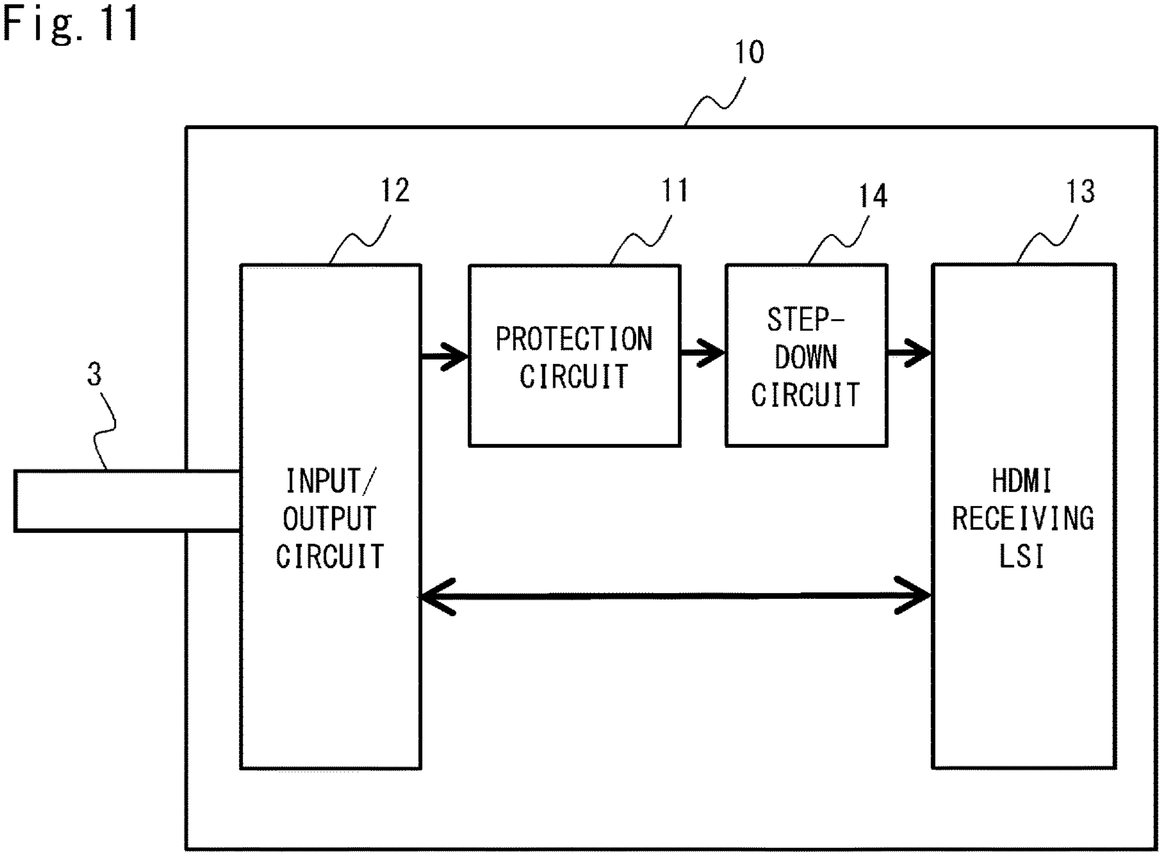
FIG. 11 shows an example of a configuration of a receiver according to a second embodiment.

Next, a second embodiment will be described with reference to the drawings. FIG. 11 shows an example of a configuration of a receiver according to this embodiment. As shown in FIG. 11, a receiver 10 according to this embodiment includes a step-down circuit 14 in addition to a protection circuit 11, an input/output circuit 12, and an HDMI receiving LSI 13, all of which are similar to those in the first embodiment.

The step-down circuit 14 is a voltage conversion circuit that converts an input DC voltage into a predetermined DC voltage lower than the input voltage. The step-down circuit 14 is disposed between the protection circuit 11 and the HDMI receiving LSI 13. The step-down circuit 14 steps down (i.e., lowers) a DC voltage of 5V that has passed through the protection circuit 11 to a voltage at which the HDMI receiving LSI 13 can operate, and outputs the stepped-down voltage to the HDMI receiving LSI 13.

Figure 12:
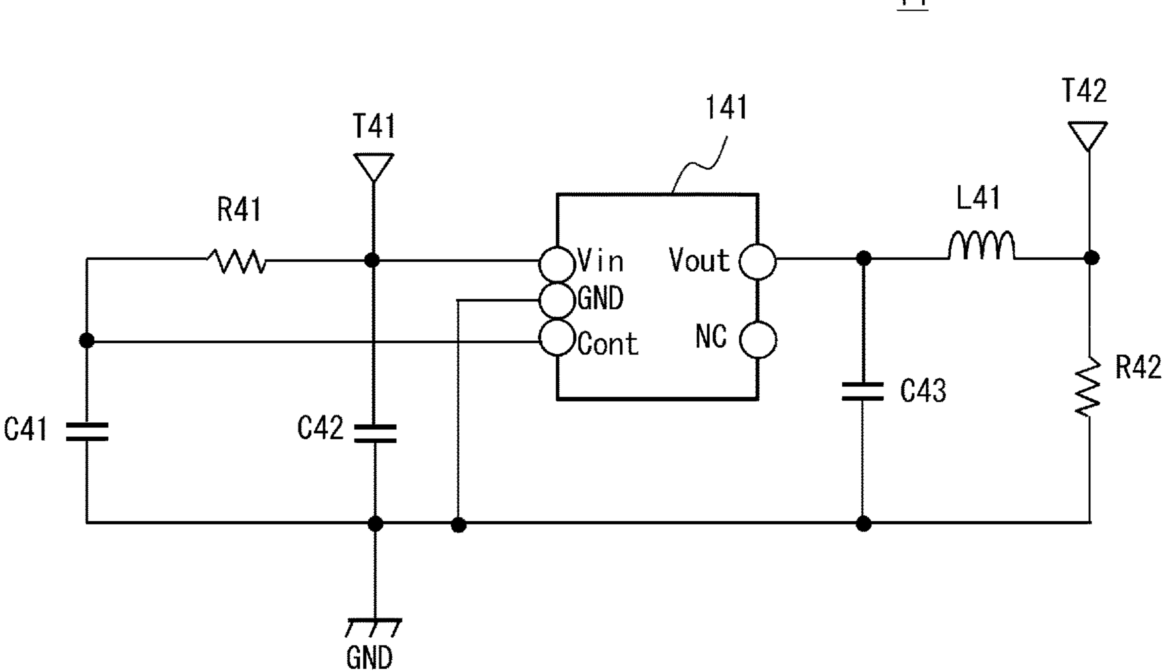
FIG. 12 shows an example of a configuration of a step-down circuit according to the second embodiment.

FIG. 12 shows an example of a configuration of the step-down circuit 14 according to this embodiment. As shown in FIG. 12, the step-down circuit 14 includes a step-down regulator 141. The step-down regulator 141 is an LDO (Low Dropout) regulator and is a step-down element that can operate with a low potential difference. For example, the step-down regulator 141 converts an input DC voltage of 5V into a DC voltage of 3.3V and outputs the stable DC voltage of 3.3V.

On the input side of the step-down regulator 141, a resistor R41 and a capacitor C41 are connected in series between an input terminal T41 and a ground GND, and a capacitor C42 is connected in parallel with the resistor R41 and the capacitor C41. An input terminal (Vin) of the step-down regulator 141 is connected between the input terminal T41 and a node between the resistor R41 and the capacitor C42. A ground terminal (GND) of the step-down regulator 141 is connected to the ground GND. A node between the resistor R41 and the capacitor C41 is connected to a control terminal (Cont) of the step-down regulator 141.

On the output side of the step-down regulator 141, an inductor L41 and a capacitor C43 are connected in series between an output terminal T42 and the ground GND, and a resistor R42 is connected in parallel with the inductor L41 and the capacitor C43. A node between the inductor L41 and the capacitor C43 is connected to an output terminal (Vout) of the step-down regulator 141.

The input terminal T41 is connected to the output terminal T12 of the protection circuit 11, and a DC5V signal that has passed through the protection circuit 11 is input to the input terminal T41. When the DC5V signal is input to the input terminal T41, the level at the control terminal of the step-down regulator 141 rises through the resistor R41, so that the step-down regulator 141 enters an operating state. As a result, the step-down regulator 141 converts the voltage of the DC5V signal input to the input terminal T41 into 3.3V, and outputs the signal having the converted voltage of 3.3V through the inductor L41.

The output terminal T42 is connected to the input terminal T30 on the input side of the HDMI receiving LSI 13, and outputs the voltage of 3.3V generated by the step-down regulator 141 to the HDMI receiving LSI 13. Note that the DC voltage of 3.3V is just an example of voltages that the HDMI receiving LSI 13 can detect at the DC5V input terminal T31, and may be any other voltage that the HDMI receiving LSI 13 can detect. Similarly to the case where the DC voltage of 5V is supplied, when the HDMI receiving LSI 13 detects the supply of a DC voltage of 3.3V, it outputs an HPD signal supplied from the HPD terminal.

As described above, in this embodiment, a step-down circuit that steps down a DC voltage of 5V that has passed through the protection circuit to a predetermined stable voltage is added in the receiver according to the first embodiment. The HDMI receiving LSI also uses the DC voltage supplied to the DC5V terminal for the input/output at the DDC terminal or the like. Therefore, it is preferred to supply a low and stable voltage within a range in which the HDMI receiving LSI can operate. In this embodiment, a DC voltage of 5V is converted into a stable DC voltage of 3.3V by the step-down circuit, and the converted DC voltage of 3.3V is supplied to the HDMI receiving LSI. In this way, it is possible to stabilize the operation of the control terminal and the data terminal through which signals or the like are received/output by using the power supply from the DC5V terminal.

According to the embodiment, it is possible to provide a protection circuit and a receiving apparatus capable of protecting an apparatus when a signal having a voltage outside a specified voltage range is input due to reflection or resonance.

It should be noted that the present invention is not limited to the above-described embodiments, and they can be modified as appropriate without departing from the scope and spirit of the invention. Although an apparatus is protected from a DC5V signal having a voltage outside a specified voltage range in the above-described embodiments, the signal is not limited to the DC5V signal. That is, an apparatus may be protected from abnormal voltages of other control signals. Further, although the protection circuit is disposed inside the receiver in the above-described embodiments, the apparatus in which the protection circuit is disposed is not limited to receivers. That is, the protection circuit may be disposed in an HDMI cable, an HDMI switcher, or the like.

The present disclosure can be suitably applied to a protection circuit and a receiving apparatus in an interface.

What is claimed is:

1. A receiving apparatus comprising:

a protection circuit comprising:

a receiving unit configured to receive a control signal having a predetermined DC (Direct Current) voltage supplied from a transmitting apparatus through a data transmission interface;

a lower limit voltage setting part configured to set a lower limit voltage of the control signal;

an upper limit voltage setting part configured to set an upper limit voltage of the control signal; and a switching part configured to allow the control signal to pass therethrough to a data reception processing unit of the data transmission interface when a voltage of the control signal is within a range between the lower limit voltage and the upper limit voltage, and prevent the control signal from passing therethrough to the data reception processing unit when the voltage of the control signal is outside the range between the lower limit voltage and the upper limit voltage;

the data reception processing unit of the data transmission interface; and a step-down circuit configured to step down the voltage of the control signal that has passed through the protection circuit and to supply the step-down signal to the data reception processing unit.

2. The receiving apparatus according to claim 1, wherein the lower limit voltage setting part comprises a first switching element configured to, when the voltage of the control signal is higher than the lower limit voltage, control the switching part by switching a signal supplied to a control terminal of the switching part so that the switching part allows the control signal to pass therethrough, and the higher limit voltage setting part comprises a second switching element configured to, when the voltage of the control signal is higher than the upper limit voltage, control the switching part by switching a signal supplied to a control terminal of the first switching element so that the switching part prevents the control signal from passing therethrough.

3. The receiving apparatus according to claim 2, wherein the lower limit voltage setting part comprises a delay element configured to delay the control signal supplied from the data transmission interface, and the first switching element performs a switching operation according to the delayed control signal.

* * * * *